United States Patent Office 2,806,298
Patented Sept. 17, 1957

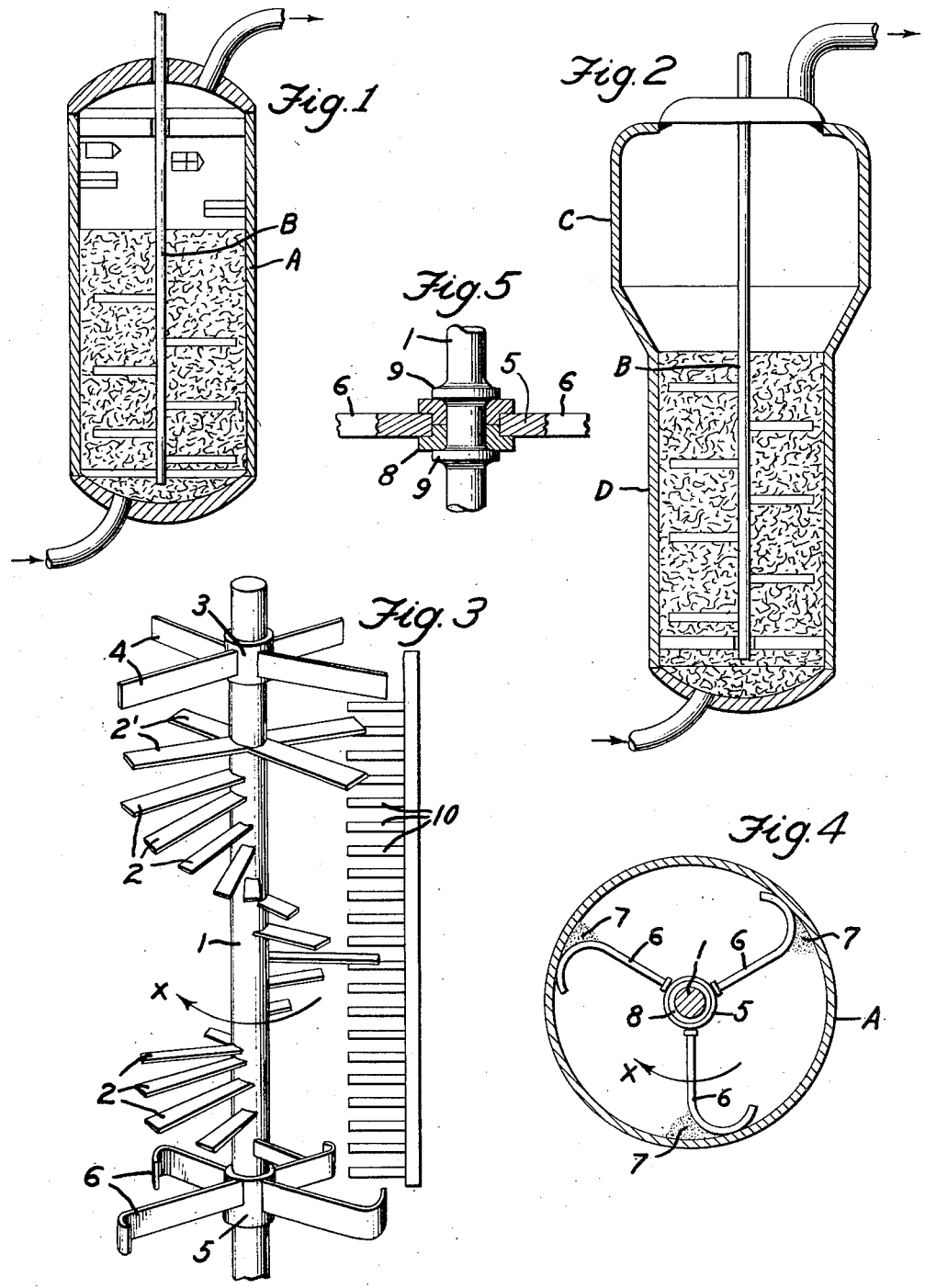

2,806,298

PROCESS AND DEVICE FOR THE TREATMENT OF SUBSTANCES IN SMALL PIECES, BY MEANS OF A FLUID

Giovanni Rossi, Milan, Italy

Application July 15, 1952, Serial No. 299,035

Claims priority, application Italy July 17, 1951

1 Claim. (Cl. 34—181)

This invention relates to a process and to a device for the physical or chemical treatment of substances in finely divided or powdered form by means of a fluid introduced from the bottom.

In previous methods in which a solid substance in finely divided or powdered form was treated by a gas or a liquid the problem arose that the stirring of the substance—which is necessary to realise a good contact with the fluid—proved difficult or even impossible because of the strong rubbing that is due to the settling, growing and/or agglomeration of the substance itself. The stirring means, as for instance blade mixing machines, become inefficient when the substance agglomerates; they may run within the mass by forming grooves or paths, but do not really stir it or put it into intimate contact with the treating fluid.

Also, the extreme and disturbing difficulty represented by the locking of the stirring device within the mass formed by the settling of the substance to treat is a further problem.

Such disadvantages are obviated by applying this invention which ensures a very efficient stirring of the substances in powder form or in small pieces, and to realise an intimate contact of them with the fluids by which they have to be treated.

In accordance with this invention, the mechanical stirring or mixing of the stuff is obtained by injecting at the same time a fluid upwardly from the bottom. The injected fluid may be precisely the same used for the desired chemical or physical treatment of the stuff, or a gas or an auxiliary liquid. The stream so formed must be excited with a sufficient speed to thwart the gravity of the particles or pieces of the substance, in order to prevent it from sticking to the bottom of the vessel.

By operating in this way, it is seen that the rotating element of the stirring apparatus moves easily within the stuff mass mixing it thoroughly.

According to another feature of this invention, the speed of the fluid is limited so that it will not carry away particles or pieces of the treated stuff. This condition is observed when the whole quantity of the stuff must remain in the vessel, from which it must be evacuated, after the treatment has been fulfilled, through the lower section or through a lateral wall of the same.

When on the contrary it is desired to evacuate a portion or the whole of the substance through the upper wall, the speed of the fluid has to be increased beyond that which will carry the substance away.

It may be for instance and it is within the limit of this invention possible to carry out the treatment of a substance in the presence of a stream of fluid running at a speed less than that would carry away the substance, then, after the treatment is fulfilled, to increase the speed, thus to effect the transportation of it.

The process according to this invention may be applied under a speed of fluid that is constant or variable; such speed may be varied within two limits, viz.: a maximum and a minimum, which latter may be equal to nought.

Such a regulation may be effected, for instance, by the injection of the fluid at a constant speed from the bottom of the mass and by draining it from the upper section, intermittently or with a varying velocity.

The process according to this invention may be exercised with any already known appliances, substantially provided with stirring means at their interior, with an inlet for the fluid at the bottom and with outlet at the upper section, as well as with openings for loading and unloading the material. But—and this represents a further feature of this invention—other arrangements have been found of advantage for the apparatus.

It is preferable to use a cylindrical vessel, the height of which is greater than its diameter. Further, in order to reach a decrease of velocity of the fluid by unloading the stuff, it has been found of advantage to widen the body of the apparatus at its upper section. Such an apparatus may be made by coupling the upper section of the cylindrical body by means of a funnel with another cylinder of larger diameter.

For the stirring operation it is preferable to provide mixing devices which are movable and capable of breaking the mass (and constructed as fixed blades, deflecting means, diaphragms or the like) located within the vessel. Fixed deflecting blades may be used in order to impart to the mass a helical movement. They may have the form of prismatic and radial elements, the cross section of which is an isosceles triangle with a vertical basis.

If the treatment is a known one, for instance, by means of a fluid of an approximately constant speed, the mixing will preferably be of movable pattern, such as a mixer with vertical rotating axle and radial inclined blades or the like.

A stirring which is particularly efficient, that suppresses the ways that the fluids have the tendency to follow as they pass through the mass, may be reached with the help of a special stirring device as per the invention described as follows.

The herewith enclosed drawings have the purpose to disclose openly the invention, but without any limit to the spirit of the same.

Fig. 1 is a schematic view in section of an apparatus for the treatment in accordance with this invention.

Fig. 2 is a schematic view in section of an apparatus with its upper portion enlarged.

Fig. 3 represents in perspective view a special implement for the devices of this invention.

Fig. 4 is a cross sectional view of said mixing device taken at the level of an intermediate support.

Fig. 5 is a longitudinal view of the same device also taken at the level of said support.

In Fig. 1, A designates the cylindrical vessel forming the body of the apparatus, and B the stirring device or rotating mixer. The substance to be treated is put into the vessel A to reach a certain height (f. i. about ⅔) so as to let a free space to allow for a swelling of the mass under the action of the fluid injected from the bottom following the arrow.

The special mixing device represented in Fig. 3 comprises substantially a rotatable shaft 1 of approximately vertical axle, concentric to the cylinder A. The radial blades 2 of the shaft are in the example of Fig. 3 located as to form a screw, whilst at the upper section there are at the same normal level to the rotating shaft a few blades 2' (four in the illustrated example) that are intended to render the mass homogeneous at its upper portion, by destroying the preferred channels of passage of the gas, and by avoiding the drainage upwardly of particles of the mass under treatment. Blades 2 are sized and located in such manner as to achieve the whole covering of the cross section of the vessel. Notwithstanding they may receive any desired shape (flat, helical, helical with variable pitch to the radius and the like). It is useful to further provide at the lower section a local accumulation of the blades in order to ensure a uniform distribution of the fluid within the mass.

The shaft 1 is provided with an upper support (and eventually also a lower one, not represented) formed by a collar 3 provided with rigid radial arms 4 the ends of which lie on the treatment vessel envelop A and one or more intermediate supports (in accordance with the total length and the cross sections of the shaft) so as to avoid strain under the flexing stresses due to the cross heads. Each intermediate support is constituted by a collar 5 provided with radial arms 6 the ends of which are bent in order to lie against the internal part of the envelop of the vessel. Arms 6 work as springing devices and maintain shaft 1 radially centered without requiring any fixing means for such arms to the envelop of the vessel A. It is further intended that arms 6 are bent toward the back with respect to the direction of rotating X of the shaft, in order to avoid any possible damage of the vessel envelop A in case of a relating movement limited between the arms 6 and said envelop. The relating movement is on the other side contrasted by the mass under treatment, that attempts to dive into corners at points 7, between arms 6 and cylinder A, as shown in Fig. 4. Collar 5 cooperates with shaft 1 by means of a bronze covering 8 placed between shoulders 9 (Fig. 5) of shaft 1, so as to hinder axial displacement of the support with respect to said shaft. For the purpose of achieving an automatic and continuous cleansing of blades 2 it is useful to provide radial blades 10 (Fig. 3) duly fixed to the cylinder and fitted as to take place between two of the movable blades. These fixed blades have also the purpose of preventing the drainage by rotating of the mass following the effect of the rotating elements. The drive of the shaft may be obtained as well from the bottom as from the upper section of the vessel.

The particulars of construction of the device may change without departing from the spirit of this invention.

The described process and devices are suitable for different physical and chemical treatments; they advantageously apply for the hydrolysis of cellulosic stuffs and especially for the treatment of exhausted olive residue from which volatile products, as furfurol, organic acids, etc. may be obtained by treating them with water steam in presence of acids.

*Example.*—100 kg. exhausted olive residue are treated with 2 kg. diluted sulphuric acid and introduced into the vacuum apparatus described above filling the vessel to about ⅔ of the internal height. Steam was injected from the bottom and evacuated at the top the cover at such a velocity, by taking account of the specific weight and size of the material as said substance, after its expansion, does not occupy the whole interior space of the apparatus A. In the same time, the stirring equipment was put into action. The operation was continued for about 20 minutes and 12 kg. furfurol were industrially produced.

I claim:

Apparatus for the treatment of finely divided or pulverized material which comprises a vertical cylindrical vessel for said material having a larger diameter at the top than at the bottom, stirring means within said vessel comprising a rotatable shaft having radial and substantially rectangular blades of different lengths arranged along a helical path, an inlet at the bottom of said vessel for the injection of pressurized steam, means for injecting the steam into said inlet with sufficient force to raise the material against the force of gravity, and an outlet at the top of said vessel for exhausting said steam, said means providing a force which is insufficient to raise the material through said outlet.

References Cited in the file of this patent

UNITED STATES PATENTS

| | | |
|---|---|---|
| 514,340 | Schumm | Feb. 6, 1894 |
| 634,999 | Schaaf | Oct. 17, 1899 |
| 749,087 | Neubert et al. | Jan. 5, 1904 |
| 1,357,467 | Monroe | Nov. 2, 1920 |
| 1,505,479 | Maitland | Aug. 19, 1924 |
| 1,735,084 | Miner et al. | Nov. 12, 1929 |
| 1,792,059 | Altwegg | Feb. 10, 1931 |
| 1,880,284 | Schenk | Oct. 4, 1932 |
| 1,919,878 | Brownlee | July 25, 1933 |
| 2,074,673 | Sachett | Mar. 23, 1937 |
| 2,117,175 | Kaster | May 10, 1938 |
| 2,140,572 | Brownlee | Dec. 20, 1938 |
| 2,277,361 | Bonatto | Mar. 24, 1942 |
| 2,292,897 | Nielsen | Aug. 11, 1942 |
| 2,309,036 | Beardsley | Jan. 19, 1943 |
| 2,336,017 | Jewell et al. | Dec. 7, 1943 |
| 2,626,786 | McGlothlin | Jan. 27, 1953 |

FOREIGN PATENTS

| | | |
|---|---|---|
| 259,473 | Great Britain | of 1926 |